J. E. PRESTON.
GALVANIC BATTERY.
APPLICATION FILED AUG. 31, 1914.
1,213,535.
Patented Jan. 23, 1917.
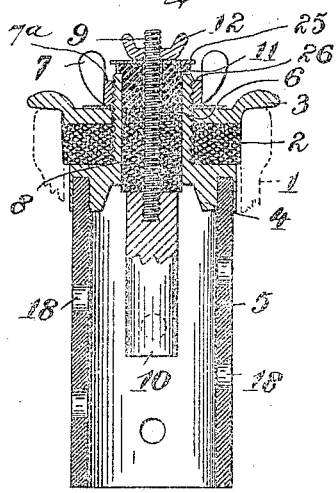
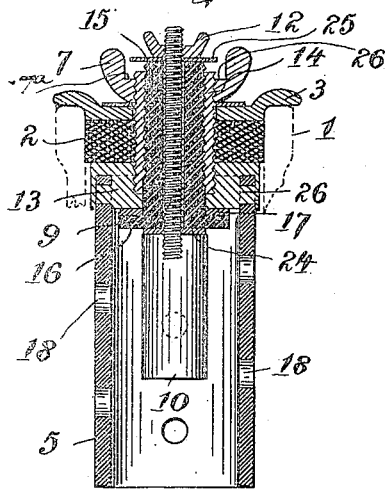
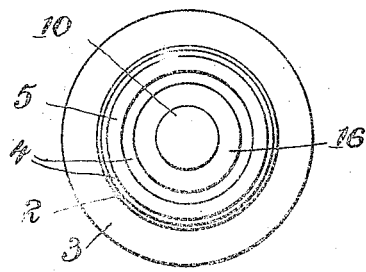
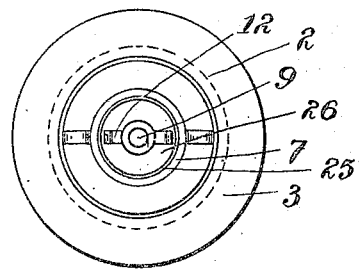
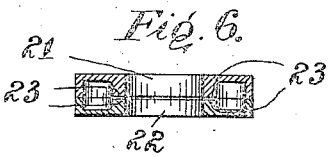
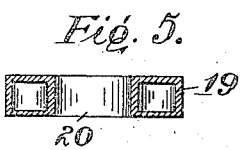
Witnesses:
Albert George Barnes.
Arthur Spricklinger.
Inventor.
John Edward Preston
by
Attorney.

UNITED STATES PATENT OFFICE.

JOHN EDWARD PRESTON, OF LONDON, ENGLAND.

GALVANIC BATTERY.

1,213,535.   Specification of Letters Patent.   Patented Jan. 23, 1917.

Application filed August 31, 1914.   Serial No. 859,402.

*To all whom it may concern:*

Be it known that I, JOHN EDWARD PRESTON, a subject of His Majesty the King of England, residing at London, England, have invented certain new and useful Improvements in Galvanic Batteries, of which the following is a specification.

This invention relates to improvements in galvanic cells; particularly to a closed galvanic battery cell having insulated positive and negative elements combined with a cover clamping plate and an intermediate elastic disk to form a removable stopper unit which is establishable into sealing relationship with the containing vessel by more tightly binding the component clamping parts together to put pressure upon the opposite faces of the disk.

By and in accordance with the present invention there is provided for a closed galvanic battery cell a removable stopper unit of the type set forth wherein the insulated conducting means of the positive and negative elements have passage through a common aperture in the elastic sealing disk whereby on compression of the disk a substantially uniform flow of the disk in all radial directions is realized to effect a fluid tight sealing of the cell. Thus a fluid tight sealing is not precluded by variations in manufacture from a given size of that portion of the containing vessel which co-acts with the elastic disk; these variations being frequently met with and are difficult to counter in cases where the flow of the disk is radially interrupted at any point.

In the accompanying drawings the invention is illustrated by way of example as applied to a single galvanic cell.

Figure 1 is a sectional elevation of the cell. Fig. 2 is a sectional elevation of a modified construction of a cell. Fig. 3 a plan view, and Fig. 4 an under plan view thereof. Figs. 5 and 6 are sectional views of modified constructions of the elastic sealing disk.

Referring to Fig. 1 of the drawings, the container 1, whether of glass, earthenware, vulcanite, or other suitable material, is plugged fluid tight by an expanding elastic disk 2, the upper surface of this being in contact with a cover plate 3. Through the expanding disk and cover plate there passes the upper and reduced portion of a metal (lead or lead alloy type metal by preference) cap or contact-piece 4, cast on or fitted to the carbon or negative cylinder 5 which is conveniently cylindrical. The upper part or reduced portion 6 of the cap or contact piece 4 is exteriorly furnished with a screw thread which is engaged by a wing-nut 7, but this threaded portion of the contact piece 4 may conveniently be made of a harder metal brass for example, or using type metal for example it can be made in one piece with the contact piece 4. The upper and reduced portion 6 of the cap or contact piece 4 is formed tubular and inside the tubulus is fitted an elastic plug 8 of insulating material, or other appropriate acid proof and insulating packing through which passes the screw threaded stem 9 rigidly connected to the cylindrical zinc or positive element 10, resting against the underside of the elastic plug 8. An insulating washer 11 is mounted on the stem 9 and rests against the plug 8. The positive element 10 is securely retained by compression of the elastic plug 8 between the element 10 and the washer 11; this being accomplished by a wing nut 12 on the stem 9 which on being tightened up draws the element 10 toward the plug 8. A metal washer 25 is interposed between the wing nut 12 and the washer 11; this washer being sufficiently large in diameter to extend over the part 26 of the wing nut 7 to thereby prevent the nut 7 from becoming detached when being unscrewed.

By tightening up the wing nut 7 the elastic disk 2 is evenly compressed between the contact piece 4 and the cover plate 3 and seals the stopper by the lateral expansion and substantially uniform flow of the elastic disk when in the neck of the container 1.

In the modified construction according to Figs. 2, 3 and 4 of the drawings, the container 1 is plugged fluid tight by the expanding elastic disk 2 and the carbon or negative cylinder 5 is secured in a groove 26 of a lead or positive contact 13 and an effective anchorage of the carbon element in the contact can be secured by aperturing the end of the carbon element so as to admit of the lead flowing through the apertures of the carbon element. An interiorly and exteriorly screw threaded metal ferrule 14 is cast in the contact 13 and thereafter sweated or otherwise secured to the contact, or the ferrule 14 and the contact 13 are made in one piece of type or other suitable metal. An insulating liner 15 formed with an insulating flange 16 is screwed into the ferrule 14 and a rubber washer 17 is interposed between the flange 16 and the contact 13 and a rubber washer 24 between the positive element 10 and the flange 16. The screw-threaded stem 9 which is connected to the positive or zinc element 10 passes through the liner 15 and is securely retained therein by the wing nut 12 co-acting with the stem 9. A metal washer 25 is interposed between the wing nut 12 and the liner 15; this washer being sufficiently large in diameter to extend over the part 7ᵃ of the wing nut, to thereby prevent the latter from becoming detached when being unscrewed.

By tightening up the wing nut 7, the elastic disk 2 is evenly compressed between the contact 13 and the cover plate 3 and seals the stopper by the lateral expansion and substantially uniform flow of the elastic disk when in the neck of the container 1.

If desired the insulating liner 15 can be frictionally held in the ferrule 14. The upper end of the insulating liner 15 projects beyond the ferrule 14 in order to avoid short circuiting.

In both constructions the negative element 5 is furnished with apertures 18 to permit the electrolyte to properly contact with the positive element 10.

The order of the elements may be reversed if desirable the zinc (or positive element) being a hollow cylinder and outside.

The fact of there being no perforation on the radius of the elastic or rubber disk, opens a path for the improvement of the disk by taking advantage of the elasticity of included air, so that the disk may be modified to take advantage of this fact, and as described below becomes a modification of the present invention. The rubber or elastic disk in this case takes the form of a hollow elastic inflated cushion 19 with a central hole 20 (Fig. 5). Or in order to secure a form (Fig. 6) which is more economical to manufacture the design may be such that it is formed as consisting of two centrally perforate disks or washers 21 and 22 the edges of which are separated by an extra thickness 23 of rubber so as to leave air between the disks. The central portion being compressed, the air is locked in and forces out the edges giving a more satisfactory sealing when the neck of the container is irregular. In order to insure the early locking in of sufficient air the rubber should be somewhat thickened around one or both of the central apertures.

Having thus described my invention what I claim and desire to secure by Letters Patent is:—

1. A removable stopper unit for the containing vessel of a closed galvanic battery cell, including insulated positive and negative elements comprising one element of a clamp, a cover plate forming the complementary clamp element, an expanding elastic disk coming between said clamping elements for plugging tightly the containing vessel when the component clamping parts are drawn together to put clamping pressure upon the opposite faces of said disk, insulated conductors leading from the positive and negative elements to the exterior of the unit, one conductor being within the other, means for drawing the component clamping parts together, and fluid sealing means between said conductors, substantially as and for the purposes described.

2. A removable stopper unit for the containing vessel of a closed galvanic battery cell, including insulated positive and negative elements comprising one element of a clamp, a cover plate forming the complementary clamp element, an expanding elastic disk coming between said clamping elements for plugging tightly the containing vessel when the component clamping parts are drawn together to put clamping pressure upon the opposite faces of said disk, insulated conductors leading from the positive and negative elements to the exterior of the unit, one conductor being within the other, the outside conductor being formed as an exteriorly threaded tubulus, and the inside conductor being formed as a screwed stem, a nut screwed to the exteriorly threaded tubulus, a nut screwed to the said stem, and fluid sealing means between said conductors, substantially as and for the purposes described.

In testimony whereof I affix my signature in presence of two witnesses.

JOHN EDWARD PRESTON.

Witnesses:
ARTHUR DREICHLINGER,
ALBERT GEORGE BARNET.